United States Patent [19]
Joshi

[11] Patent Number: 5,209,285
[45] Date of Patent: May 11, 1993

[54] INCLINED TUBE RADIATOR

[75] Inventor: Shrikant M. Joshi, Getzville, N.Y.

[73] Assignee: General Motors Corporation, Detroit, Mich.

[21] Appl. No.: 587,300

[22] Filed: Sep. 24, 1990

[51] Int. Cl.$^5$ .......................... B60K 13/02; F01P 7/02
[52] U.S. Cl. ........................................ 165/41; 165/44;
    165/51; 165/153; 123/41.48; 123/41.49;
    180/68.1; 180/68.4
[58] Field of Search ............... 165/41, 44, 51, 152,
    165/153; 123/41.48, 41.49; 180/68.1, 68.4

[56] References Cited
U.S. PATENT DOCUMENTS

| | | | |
|---|---|---|---|
| 1,803,156 | 4/1931 | Wagner | 165/44 |
| 1,818,144 | 8/1931 | MacLeod | 165/44 |
| 2,423,175 | 7/1947 | Churchill et al. | 123/41.48 |
| 3,205,964 | 9/1965 | Henry-Biabaud | 165/44 |
| 3,552,483 | 1/1971 | North et al. | 123/41.49 |
| 3,933,136 | 1/1976 | Burst | 165/51 |
| 4,362,208 | 12/1982 | Hauser | 165/51 |
| 4,618,020 | 10/1986 | Noda | 180/68.1 |
| 4,690,204 | 9/1987 | Reichel et al. | 165/44 |
| 4,938,303 | 7/1990 | Schaal et al. | 123/41.48 |

FOREIGN PATENT DOCUMENTS

| | | | |
|---|---|---|---|
| 414337 | 8/1910 | France | 165/152 |
| 400113 | 11/1942 | Italy | 123/41.48 |
| 0019694 | 2/1983 | Japan | 165/151 |
| 078296 | 5/1985 | Japan | 165/44 |
| WO8101608 | 6/1981 | World Int. Prop. O. | 165/151 |

Primary Examiner—John K. Ford
Attorney, Agent, or Firm—Ronald L. Phillips

[57] ABSTRACT

An inlet air passage in the aerodynamically configured front end of a motor vehicle directs an inlet air stream at an inclination upwardly from the bottom of the front end of the vehicle and across a radiator for cooling engine coolant and wherein the radiator has coolant tubes and air centers for forming air flow passages through the radiator between spaced headers. The tubes are inclined with respect to the vertical headers at an angle selected to locate the air flow passages parallel to an inlet air stream for aligning the inlet air stream with the air flow passages for reducing air pressure drop across the radiator.

1 Claim, 2 Drawing Sheets

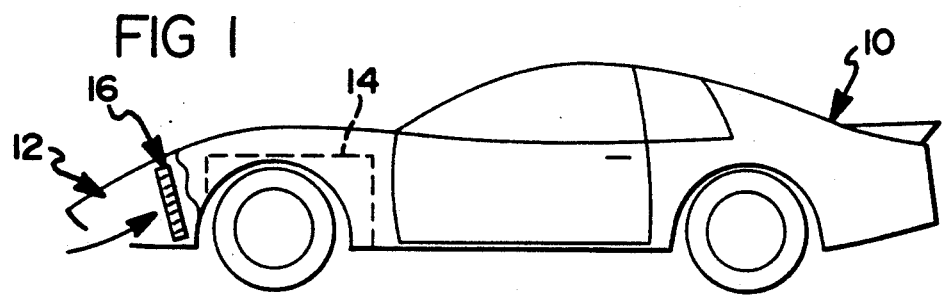
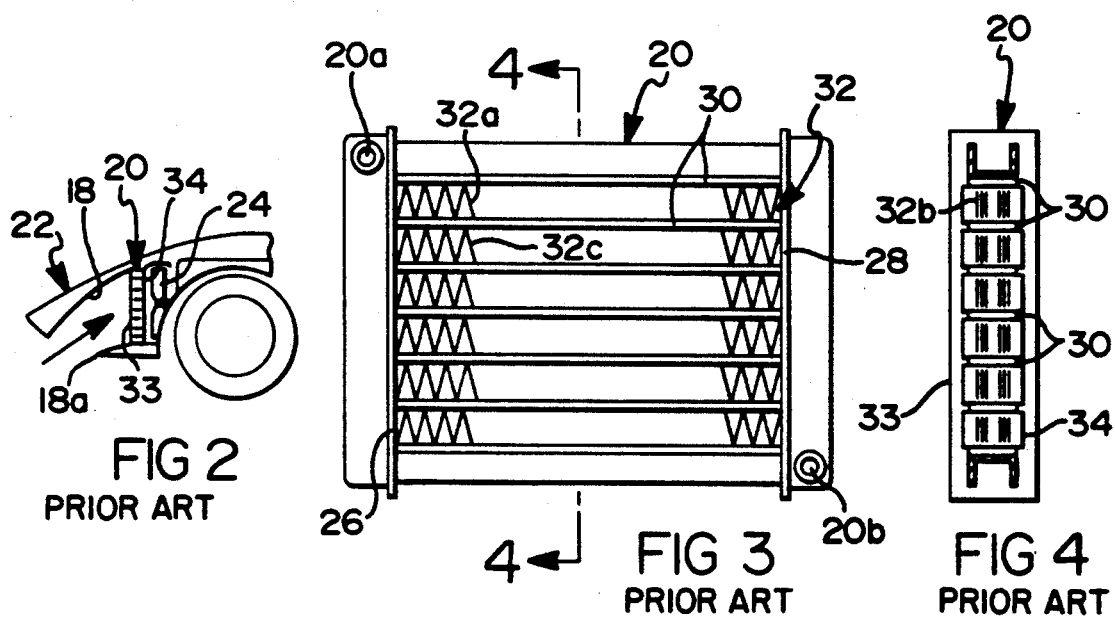
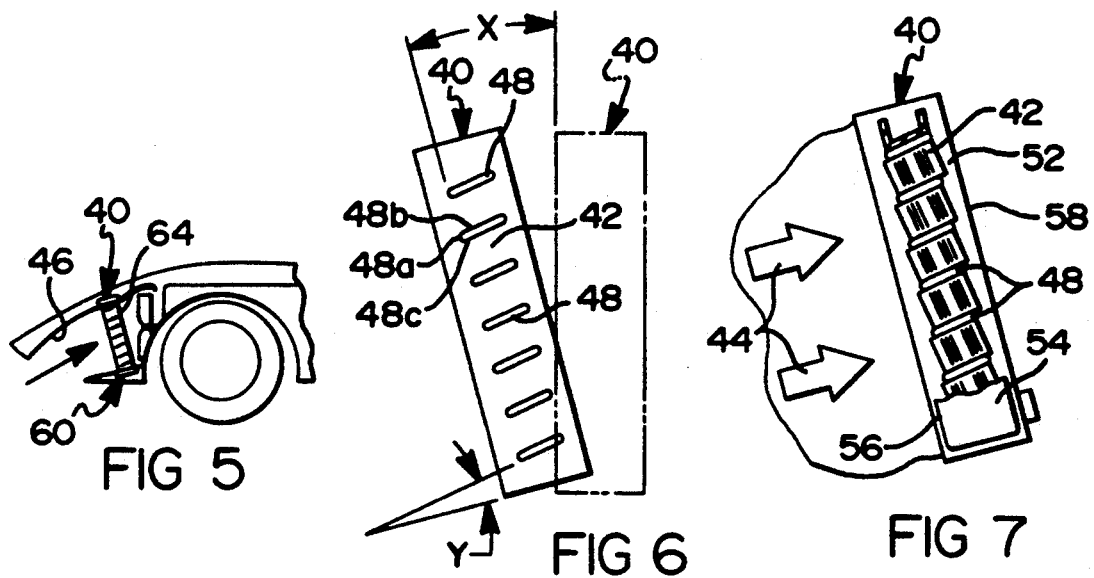

INCLINED TUBE RADIATOR

FIELD OF THE INVENTION

This invention relates to engine coolant systems and more particularly to engine coolant systems including a radiator located in the inlet air passage of a motor vehicle having an aerodynamically configured front end.

BACKGROUND OF THE INVENTION

In the past engine coolant radiators for sports cars have been located within an inlet air stream duct to the engine compartment. In aerodynamically configured front ends of such vehicles the radiator is tilted from the vertical to conform to a reduced vertical space within the underhood space of the vehicle. Such disposition of the radiator is required not only to fit a limited underhood space but is also required to locate the radiator within an inlet air stream duct characterized by having an inlet entering the engine compartment through the bottom of the vehicle front end rather than through a front radiator.

While the radiator is located at an angle to the inlet air stream the tubes and air centers of the radiator define air flow passages through the radiator which are not parallel to the incoming airflow through the bottom inlet. Accordingly, the tubes offer more resistance to flow than in the case of radiators vertically disposed downstream of a front grill. Increased pressure drop results with a loss in heat exchange efficiency.

Other radiators are known which are located in duct systems of a motor vehicle. U.S. Pat. No. 4,690,204 discloses an intercooler located in a rear engine vehicle. The intercooler is tilted from the vertical to conform to a limited rear space in the vehicle. The tubes of the intercooler are conventionally oriented. U.S. Pat. No. 4,362,208 discloses a truck radiator which is disposed in various tilted dispositions within a cooling duct. The tubes of the truck radiator are conventionally oriented within the cooling duct.

In none of the prior art configurations is the tilted radiator provided with tubes which are in turn tilted to conform air passages within the radiator to be parallel to the incoming airflow across the radiator.

SUMMARY OF THE INVENTION

The present invention is directed to a coolant radiator for a motor vehicle having an air cooling duct with an inlet located at the bottom of an aerodynamically configured front end and wherein the coolant radiator has tubes formed therein at an angle with respect to a line perpendicular to the radiator so as to located the air passages through the radiator parallel to the air flow through the coolant duct so as to reduce air pressure drop across the radiator.

In one embodiment the radiator has two vertical headers and the coolant tubes are flat tubes connected between the vertical headers to form coolant passages therebetween and wherein each of the flat tubes form a flow path having an air center therein; and wherein the flat tubes are each tilted with respect to the vertical headers to locate the flow paths parallel to the inlet air flow stream so as to decrease resistance of the radiator to airflow therethrough so as to increase the underhood airflow in the vehicle.

An object of the present invention is to reduce the material in a coolant radiator for a sports car having an aerodynamically configured front end with a cooling duct having an inlet at the bottom and front of the front end and wherein the coolant radiator is tilted to fit within a limited space within the underhood of the vehicle and wherein air flow passages through the radiator are formed at an angle with respect to the tilted radiator to be parallel to the inlet air stream through the cooling duct.

Still another object of the present invention is to provide an engine coolant system for motor vehicles having aerodynamically configured front ends with an air cooling passage directing an inlet air stream into the vehicle from the bottom of the vehicle front end for flow upwardly at an angle of inclination with respect to a horizontal plane and a motor vehicle radiator located in the inlet air stream the radiator having a coolant side formed by a plurality of coolant tubes and the radiator further having an air side for crossflow of inlet cooling air with respect to the coolant tubes for extracting heat from coolant passing through the coolant tubes; the radiator being tilted within the underhood space of the vehicle to conform to a limited vertical dimension within the underhood space and tubes being tilted at an angle with respect to the radiator for forming a plurality of air flow passages located parallel to the inlet air stream to reduce airflow resistance across the radiator.

Another object of the present invention is to increase the cooling efficiency of a radiator in an engine coolant system for motor vehicles having aerodynamically configured front ends with an air cooling passage directing an inlet air stream into the vehicle from the bottom of the vehicle front end for flow upwardly at an angle of inclination with respect to a horizontal plane and a radiator located in the cooling air stream for extracting heat from engine coolant directed therethrough; the radiator having a plurality of parallel tube passes having upper and lower surfaces and leading edges located in a common plane for forming a plurality of cross-flow openings through the radiator; the tube passes each angled with respect to a line formed perpendicular to the common plane for forming air flow openings parallel to the cooling air stream for reducing air pressure drop across the radiator.

Yet another object of the present invention is to provide the engine coolant system of the preceding object wherein the parallel tube passes are formed by flat tubes each having a width greater than the height thereof; the flat tubes each having a leading edge located in a common plane; the leading edges joined to upper and lower surfaces for forming flow paths inclined with respect to a line perpendicular to the common plane for aligning the flow paths in the same direction as the upwardly directed angle of inclination of the cooling airflow stream for reducing air pressure drop across the radiator.

A further object of the present invention is to provide a method for reducing the air pressure drop across the radiator in an engine coolant system for motor vehicles having aerodynamically configured front ends with an air cooling passage directing an inlet air stream into the vehicle from the bottom of the vehicle front end for flow upwardly at an angle of inclination with respect to a horizontal plane and a motor vehicle radiator located in the inlet air stream for extracting heat from engine coolant directed therethrough and wherein the radiator has a coolant side formed by a plurality of coolant tubes and wherein the radiator has air side passages for crossflow of inlet cooling air with respect to the coolant tubes for extracting heat from coolant passing through the coolant tubes the method comprising the steps of:

tilting a radiator with respect to vertical for providing a first alignment of the radiator with respect to the upwardly inclined inlet air stream to partially align the air side passages in parallel with the inlet air stream;

and tilting coolant tubes in the radiator for providing a second alignment of the air side passages with respect to the upwardly inclined inlet air stream to fully align the air side passages parallel to the inlet air stream for reducing air pressure drop across the radiator.

Still another object of the present invention is to provide a vehicle front end having a cooling air stream duct therein for directing inlet cooling air into the underhood at the front of the vehicle from the bottom of the front end for upwardly inclined flow into the engine compartment and including a coolant radiator within the passage means for cooling engine coolant by airflow across the radiator and wherein the radiator has a coolant side formed by a plurality of coolant tubes and wherein the radiator has an air side for crossflow of inlet cooling air with respect to the coolant tubes for extracting heat from coolant passing through the coolant tubes characterized by the radiator having a plurality of air flow passages between an air inlet end and an air outlet end and the radiator being tilted within the air stream duct to locate the air inlet end and the air outlet end at an angle with respect to vertical to partially align the air flow passages into parallelism with the upwardly inclined air flow; and each of the plurality of air flow passages being inclined with respect to a line perpendicular to the air inlet end to fully align the air flow passage into parallelism with the inlet air stream to reduce airflow resistance across the radiator.

Yet another object of the present invention is to provide a vehicle front end having a cooling duct for inlet air flow into the underhood at the front of the vehicle from the bottom of the front end for upwardly inclined air flow into the engine compartment and including a coolant radiator within the passage means for cooling engine coolant by airflow across the radiator and wherein the radiator has a coolant side formed by a plurality of coolant tubes and wherein the radiator has an air side for crossflow of inlet cooling air with respect to the coolant tubes for extracting heat from coolant passing through the coolant tubes characterized by a plurality of air flow passages in the radiator between an air inlet end and an air outlet end thereof; a support for the radiator locating it within the vehicle to locate the inlet end and said outlet end at an angle with respect to vertical to partially align the air flow means into parallelism with the upwardly inclined air flow; and wherein each of the plurality of air flow passages are inclined with respect to a line perpendicular to the inlet end to fully align the air flow passages into parallelism with the inlet air stream to reduce airflow resistance across the radiator; and the air flow passages including a heat transfer air center with a plurality of bent fins with louver means therein the bent fin being bent along a first axis and including a second axis formed at an angle with respect to the air inlet end generally parallel to the inlet air stream.

These and other features, objects and advantages of the present invention will become better understood from the following description when taken in conjunction with the accompanying drawings wherein:

BRIEF DESCRIPTION OF THE DRAWINGS

FIG. 1 is diagrammatic view of a sports car having an aerodynamically configured front end including the present invention;

FIG. 2 is a diagrammatic view of the front end in FIG. 1 with a conventional radiator;

FIG. 3 is a front elevational view of a prior art radiator;

FIG. 4 is a sectional view taken along the line 4—4 of FIG. 3 looking in the direction of the arrows;

FIG. 5 is a diagrammatic view of the front end in FIG. 1 with the radiator of the present invention;

FIG. 6 is a diagrammatic view showing the angular relationship of tubes in the present invention with respect to an inlet air stream through the front end of the motor vehicle shown in FIG. 1;

FIG. 7 is a cross-sectional view like FIG. 2 showing a radiator of the present invention;

DETAILED DESCRIPTION OF THE INVENTION

Figure 8:
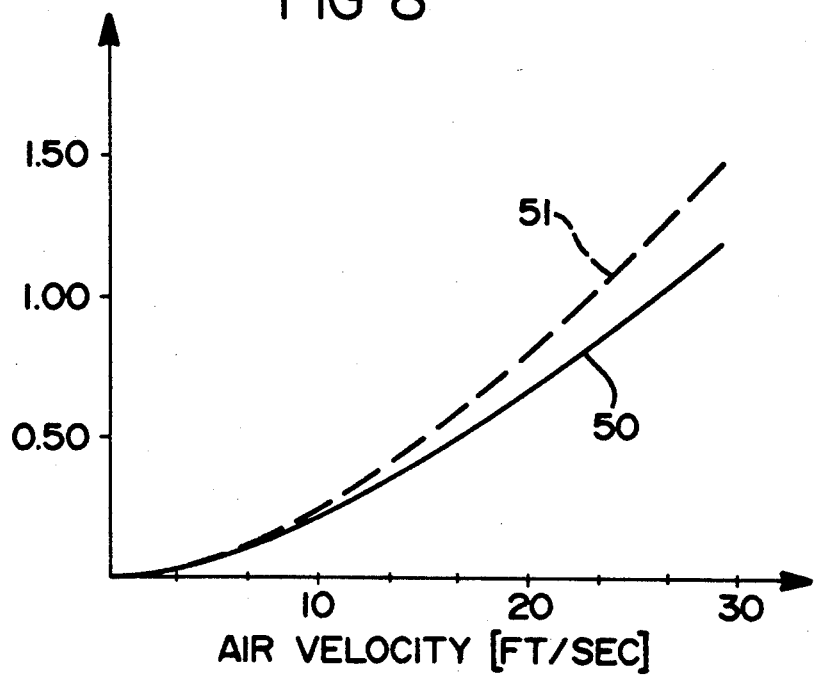
FIG. 8 is a chart showing the improvement in air pressure drop across a radiator including the present invention.

Referring now to FIG. 1, a motor vehicle 10 is illustrated including an aerodynamically configured front end 12 formed upstream of a low profile engine compartment having a limited vertical space for a coolant cooled engine 14 associated with a radiator 16 constructed and arranged in accordance with the present invention.

In the past, as shown in FIGS. 2-4, conventional sports car have included a inlet air duct 18 with an inlet 18a at the bottom front end of the vehicle. As shown in FIG. 2, such vehicles have had a radiator 20 tilted within the air duct 18 in order to fit the radiator 20 within the limited vertical confines of an aerodynamically configured front end 22. In such arrangements an engine fan or an auxiliary fan 24 is operated to assist ram air flow across the radiator 20 for extracting heat from coolant directed therethrough in a known manner by a known coolant pump and radiator hoses connected respectively between an inlet 20a and an outlet 20b of the radiator 20. In the prior art radiator 20, vertical headers 26, 28 have coolant tubes 30 directed therebetween for flow of coolant between the vertical headers 26, 28. The coolant flow has heat extracted therefrom by air centers 32 formed by bending sheet metal materials into a plurality of bent fins 32a each having louvers 32b formed therein. The fins 32a have a height and a pitch to form air passages 32c from the air inlet end 33 of the radiator 20 to the air outlet end 34 thereof.

When such prior art radiators 20 are tilted from the vertical to conform to the limited underhood spaces of a motor vehicle the coolant tubes 30 are located out of parallelism with the direction of flow of the inlet air stream as is best shown in FIG. 2. As a consequence the tubes 30 increase resistance to airflow across the radiator 20 to result in a pressure drop curve as shown in FIG. 8 at reference numeral 51.

According to one aspect of the present invention an improved method for reducing pressure drop across a radiator is to first tilt a radiator 40 within the inlet air stream duct through an angle X to partially align air flow passages 42 through the radiator with the generally upwardly inclined inlet air stream 44 in an inlet duct 46. Additionally the method includes the steps of further tilting the coolant tubes 48 of the radiator 40 through an angle Y to fully align the passages 42 in a parallel relationship with the inlet air stream 44, as best shown in FIG. 7. By virtue of this method there is a lesser amount of resistance to air flow through the inlet duct 46 and as a consequence, the air pressure drop across the radiator 40 is reduced at different air speeds as shown by curve 50 in the air pressure drop chart of FIG. 8. The pressure drop for a conventional radiator is shown by curve 51. A comparison of curve 50 with curve 51 clearly shows that when radiator tubes 48 are oriented parallel to the air stream 44, air pressure drop is decreased. For example, at an air velocity of 20 ft/sec., the invention reduces pressure drop on the order of 20%.

More specifically, in the embodiment of the invention shown in FIGS. 5-7, the radiator 40 has a pair of side headers 52, 54 each joined by a plurality of coolant tubes 48. The coolant tube 48 has a width greater than its height and adjacent tubes 48 form a plurality of parallel, inclined passages 42 in the radiator 40 which extend between an air inlet end 56 of the radiator 40 to an air outlet end 58 of the radiator. Each of the passages 56 are arranged parallel to the inlet air stream 44 by virtue of a radiator support 60 which locates the radiator 40 at a first angle X with respect to the vertical to fit the radiator within a limited vertical space 64 within the duct 46 and to partially align the passages 42 parallel to the inlet air stream 44. The tubes 48 are each inclined an angle Y from a line perpendicular to the air inlet end 56 as is best shown in FIGS. 6 and 7 to fully align the passages 42 parallel to the inlet air stream. As a consequence inlet edges 48a of each of the tubes 48 and spaced upper and lower surfaces 48b and 48c of each of the tubes 48 are aligned in a streamlined relationship with the inlet air stream 44 so as to minimize resistance to air flow across the radiator 40. As shown in FIG. 7, the air passages 42 are formed by heat exchanger elements shown as air centers 45 with front edges 45a lying planes that are displaced progressively away from each other from the bottom to the top of the radiator in the direction of the airflow arrows 44. The air center 45 also are shown as having rear edges 45b lying in planes that are displaced progressively away from each other from the bottom to the top of the radiator in the direction of the arrows 44. The air centers 45 have top and bottom edges 45c and 45d that are parallel to the surfaces 48b and 48c of each of the tubes 48. This causes less pressure drop as shown by the previously discussed curve 50 in FIG. 8.

Figure 9:
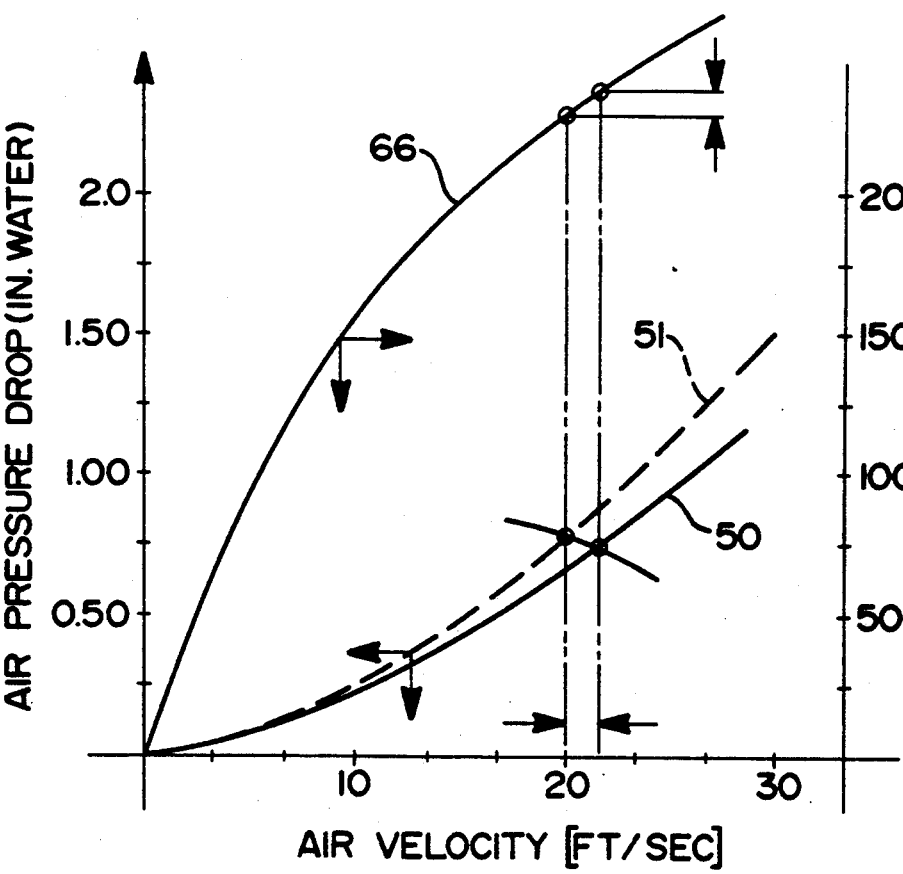
FIG. 9 is a chart showing the improvement in air pressure drop with respect to improvement in heat exchange performance in a radiator including the present invention.

FIG. 9 shows the airflow increase superimposed on a heat transfer performance curve 66 and the resultant effect. One representative difference in heat transfer performance at an air inlet velocity of 20 feet per second is shown as producing an airflow increase of about 8 percent which results in a radiator performance improvement in the range of about 5%-8%.

While the invention is shown in a radiator application the same principles apply to other heat transfer devices located in an air stream duct having a vertical height limitation requiring a first angular disposition of the heat exchanger with respect to an air flow stream and a second angular disposition of tubes of the heat exchanger to produce full parallelism between air passages through the tubes and the inlet air stream for cooling the heat exchanger, examples of such other heat transfer devices includes condensers, heater cores and other devices used in the transfer of heat between an air flow cooling stream and a second fluid directed through the tubes of the heat exchanger.

It will be understood by those skilled in the art that the foregoing description is of a preferred embodiment of the disclosed device and a method for exchanging heat between coolant passing through its tubes and an air stream directed therethrough, and that various changes and modifications may be made to the present invention without departing from the spirit and scope thereof.

What is claimed is:

1. A passenger vehicle having a body with a front engine compartment including an inlet ram air passage therein said inlet ram air passage extending from the bottom of the front end of the vehicle for upwardly inclined flow into the engine compartment;
   a coolant radiator located within said ram air passage for cooling engine coolant by airflow across said radiator;
   said radiator having an air side and a coolant side;
   air flow means including spaced parallel flat tubes on the air side of said radiator for forming a plurality of air flow passages through said radiator;
   means for supporting said radiator within said vehicle to locate said radiator at an acute angle with respect to a vertical plane;
   each of said plurality of air flow passages inclined at an angle to substantially fully axially align said air flow passages with the direction of air flow through said inlet ram air passage to reduce airflow resistance across said radiator;
   each of said air flow means including heat exchange elements extending between said tubes along the full length thereof and supported on each of said tubes; said heat exchange elements having inlet ends and outlet ends and passages therebetween located in axial alignment with the upwardly inclined direction of said inlet ram air passage and each of said heat exchange elements having inlet edges lying in planes that are progressively displaced away from each other in the direction of air flow through said inlet ram air passage from the bottom to the top of the radiator and each of said heat exchange elements having outlet edges lying in planes that are progressively displaced away from each other in the direction of air flow through said inlet ram air passage from the bottom to the top of the radiator.

* * * * *